(12) United States Patent
DeLuca et al.

(10) Patent No.: US 8,533,715 B2
(45) Date of Patent: Sep. 10, 2013

(54) VIRTUAL MACHINE MANAGEMENT

(75) Inventors: Lisa Seacat DeLuca, San Francisco, CA (US); Charles M. Kinard, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/205,876

(22) Filed: Aug. 9, 2011

(65) Prior Publication Data
US 2013/0042234 A1 Feb. 14, 2013

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 7,853,958 B2 | 12/2010 | Mathew et al. | |
| 7,853,960 B1 | 12/2010 | Agesen et al. | |
| 2005/0132362 A1 | 6/2005 | Knauerhase et al. | |
| 2008/0301673 A1* | 12/2008 | Kawasaki et al. | 718/1 |
| 2009/0164356 A1* | 6/2009 | Bakman | 705/34 |
| 2010/0131959 A1* | 5/2010 | Spiers et al. | 718/105 |
| 2010/0153945 A1* | 6/2010 | Bansal et al. | 718/1 |
| 2010/0211829 A1* | 8/2010 | Ziskind et al. | 714/48 |
| 2011/0004574 A1 | 1/2011 | Jeong et al. | |
| 2011/0004676 A1 | 1/2011 | Kawato | |
| 2011/0004877 A1 | 1/2011 | Wu | |
| 2011/0022861 A1* | 1/2011 | Agneeswaran et al. | 713/310 |
| 2011/0154320 A1* | 6/2011 | Verma | 718/1 |
| 2011/0225582 A1* | 9/2011 | Iikura et al. | 718/1 |
| 2011/0239215 A1* | 9/2011 | Sugai | 718/1 |
| 2012/0131161 A1* | 5/2012 | Ferris et al. | 709/223 |
| 2012/0260248 A1* | 10/2012 | Katiyar et al. | 718/1 |

* cited by examiner

*Primary Examiner* — Emerson Puente
*Assistant Examiner* — Adam Lee
(74) *Attorney, Agent, or Firm* — Schmeiser, Olsen & Watts; William Schiesser

(57) ABSTRACT

A virtual machine management method and system is provided. The method includes receiving by a computing system, a list of virtual machines deployed within an enterprise. The computing system determines that a specified time period has elapsed during deployment and a list of resources and transactions associated with the virtual machines is retrieved. The computing system calculates a cost value and service value for deploying the virtual machines and a premium value associated with the services. The computing system determines if the premium value is within a policy for the enterprise.

18 Claims, 4 Drawing Sheets

VIRTUAL MACHINE MANAGEMENT

TECHNICAL FIELD

The present invention relates to a method and associated system for managing deployed virtual machines in an enterprise.

BACKGROUND

Managing apparatuses typically comprises an inaccurate process with little flexibility. Apparatus management within a system typically includes a manual process. Manually managing apparatuses may be time consuming and require a large amount of resources.

SUMMARY

The present invention provides a method comprising: receiving, by a computer processor of a computing system, a list of running virtual machines deployed for performing services within an enterprise; determining, by the computer processor, a specified time period associated with periodic checks of each virtual machine of the virtual machines; determining, by the computer processor, that the specified time period has elapsed since a last benefit check of the periodic checks; retrieving, by the computer processor, a first list of resources consumed by each virtual machine during the specified time period; retrieving, by the computer processor, a second list of transactions performed by each virtual machine during the specified time period; calculating, by the computer processor based on the first list of resources, a first cost value for each virtual machine for the specified time period; calculating, by the computer processor based on the services, a first service value for each virtual machine for the specified time period; calculating, by the computer processor based on the first cost value and the first service value, a first premium value associated with the services; and determining, by the computer processor, if the first premium value is within a policy for the enterprise.

The present invention provides a computing system comprising a computer processor coupled to a computer-readable memory unit, the memory unit comprising instructions that when executed by the computer processor implements a method comprising: receiving, by the computer processor of a computing system, a list of running virtual machines deployed for performing services within an enterprise; determining, by the computer processor, a specified time period associated with periodic checks of each virtual machine of the virtual machines; determining, by the computer processor, that the specified time period has elapsed since a last benefit check of the periodic checks; retrieving, by the computer processor, a first list of resources consumed by each virtual machine during the specified time period; retrieving, by the computer processor, a second list of transactions performed by each virtual machine during the specified time period; calculating, by the computer processor based on the first list of resources, a first cost value for each virtual machine for the specified time period; calculating, by the computer processor based on the services, a first service value for each virtual machine for the specified time period; calculating, by the computer processor based on the first cost value and the first service value, a first premium value associated with the services; and determining, by the computer processor, if the first premium value is within a policy for the enterprise.

The present invention provides a computer program product, comprising a computer readable storage medium having a computer readable program code embodied therein, the computer readable program code comprising an algorithm that when executed by a computer processor of a computing system implements a method comprising: receiving, by the computer processor of the computing system, a list of running virtual machines deployed for performing services within an enterprise; determining, by the computer processor, a specified time period associated with periodic checks of each virtual machine of the virtual machines; determining, by the computer processor, that the specified time period has elapsed since a last benefit check of the periodic checks; retrieving, by the computer processor, a first list of resources consumed by each virtual machine during the specified time period; retrieving, by the computer processor, a second list of transactions performed by each virtual machine during the specified time period; calculating, by the computer processor based on the first list of resources, a first cost value for each virtual machine for the specified time period; calculating, by the computer processor based on the services, a first service value for each virtual machine for the specified time period; calculating, by the computer processor based on the first cost value and the first service value, a first premium value associated with the services; and determining, by the computer processor, if the first premium value is within a policy for the enterprise.

The present invention advantageously provides a simple method and associated system capable of managing apparatuses.

BRIEF DESCRIPTION OF THE DRAWINGS

FIG. 2, including

DETAILED DESCRIPTION

Figure 1:
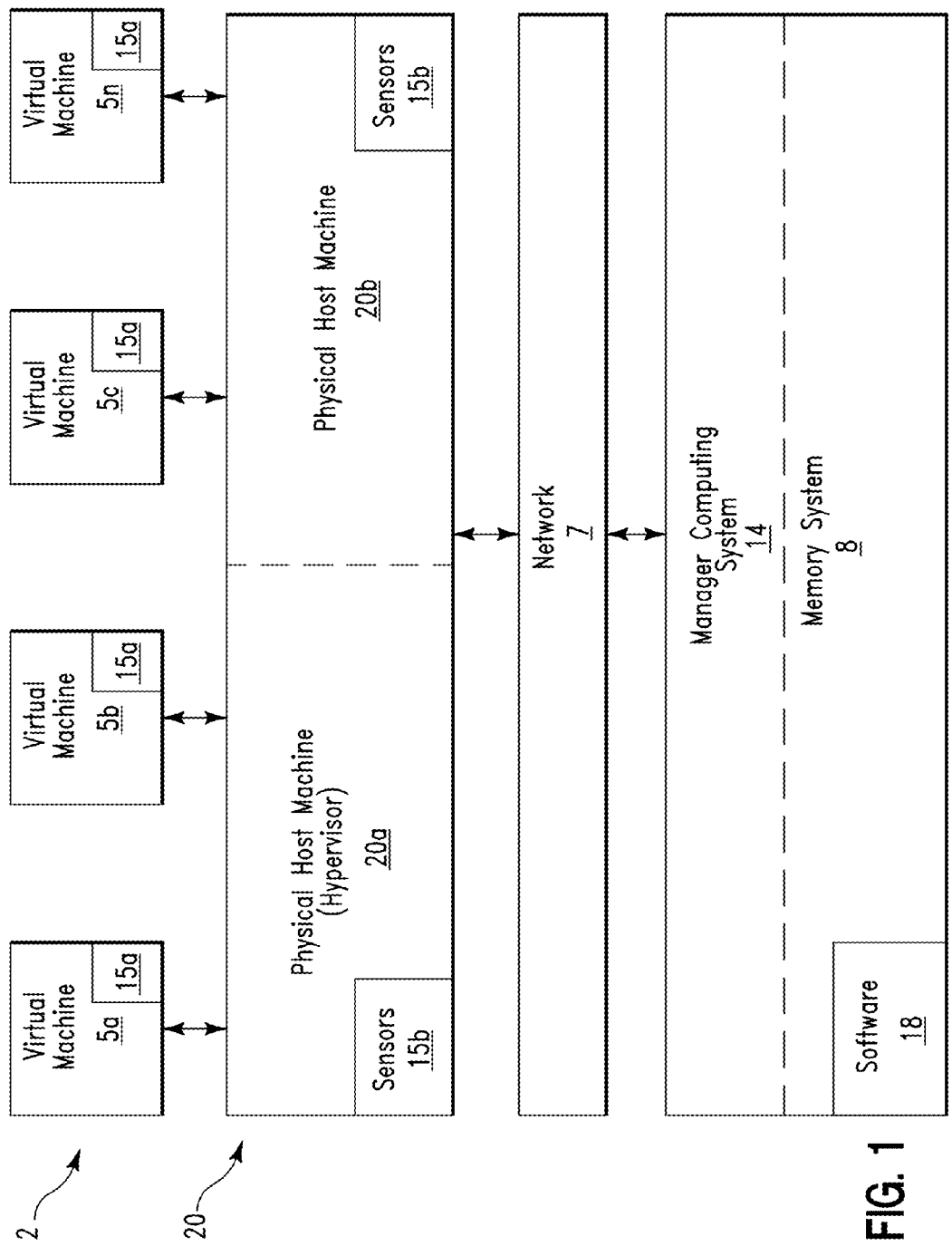
FIG. 1 illustrates a value based system for automatically managing virtual machines, in accordance with embodiments of the present invention.

FIG. 1 illustrates a value based system 2 for automatically managing virtual machines $5a \ldots 5n$, in accordance with embodiments of the present invention. System 2 uses resource consumption sensors $15a$ and $15b$ (i.e., sensing resource consumption by virtual machines) to determine virtual machine deployment. The virtual machine deployment is combined with a value and a premium multiplier supplied/updated by a virtual machine deployer. System 2 provides the following functionality:

1. A method for using sensors to determine resources consumed by virtual machines in order to gather data to eventually determine a cost of the virtual machines.
2. A method for mapping values for the sensors to a number describing a cost of the resources with respect to each virtual machine.
3. A method for mapping the sensor values (for transactions flowing through each virtual machine) to a number describing a value for associated (beneficial) transactions for each virtual machine.
4. A method for calculating a positive or negative benefit for each virtual machine.

5. A method for comparing the positive or negative benefit to a time related threshold to determine which virtual machines should be disabled or removed.

System 2 of FIG. 1 comprises virtual machines 5a . . . 5n connected via a host machine 20 connected through a network 7 to a manager computing system 14 (i.e., a virtual machine deployer). Host machine 20 may comprise a physical host machine hypervisor 20a and/or a physical host machine 20b. Alternatively, virtual machines 5a . . . 5n and host machine 20 may be directly connected to manager computing system 14 (i.e., without network 7). Virtual machines 5a . . . 5n comprise resource consumption sensors 15a. Network 7 may comprise any type of network including, inter alia, a telephone network, a local area network, (LAN), a wide area network (WAN), the Internet, a wireless network, etc. Manager computing system 14 may comprise any type of computing system(s) including, inter alia, a computer (PC), a server computer, a database computer, etc. Manager computing system 14 comprises a memory system 8 comprising a software application 18. Manager computing system 14 may additionally comprise physical host machine hypervisor 20a and/or a physical host machine 20b. Alternatively, managing computing system 14 may be located in any of virtual machines 5a . . . 5n. Physical host machine hypervisor 20a and/or physical host machine 20b may comprise resource consumption sensors 15b. Resource consumption sensors 15b may be alternatively and/or additionally be located external (e.g., sensors 15a within virtual machines 5a . . . 5n, within a hypervisor, etc) to physical host machine hypervisor 20a and/or physical host machine 20b. Memory system 8 may comprise a single memory system. Alternatively, memory system 8 may comprise a plurality of memory systems. Memory system 8 comprises a software application 17 for automatically managing deployment of virtual machines 5a . . . 5n.

System 2 enables resource consumption sensors 15a and 15b combined with values and premium multipliers supplied/updated by computing system 14. Resource consumption sensors 15a and 15b are used to determine:

1. Virtual machines (e.g., virtual machines 5a . . . 5n) deployed in an enterprise. A list of the deployed virtual machines may be generated.
2. Resources consumed by each virtual machine. Resources consumed may be measured by sensors (e.g., resource consumption sensors 15a and 15b) internal to the virtual machines or by sensors in a hypervisor that measure physical resources of each virtual machine. Associated sensor measurement values are mapped to a number describing a cost of these resources. The cost number may comprise an abstract value (e.g., points) or a concrete value (e.g., dollars) if using pricing information (e.g., hardware acquisition & maintenance, raised floor space, power, cooling, a general aggregate financial cost, etc).
3. Transactions flowing through each virtual machine. For example, a simple count of Web server hits or service invocations. The sensor measurement values are mapped to a number describing a value of these transactions. The value number may comprise an abstract value (e.g., a number of service invocations) or a concrete value (e.g., dollars) to map back to a revenue or a profit of each transaction.

System 2 enables a process for determining a premium. For example, a person supplies a premium value describing a premium of a service. The premium value comprises a number capturing an importance (e.g., high importance>1.0, low importance<1.0, etc) or some other adjustment to a value. The premium value may be supplied at deployment time (for a virtual machine) and/or updated during a lifetime of the virtual machine. The premium value is used as a multiplier to adjust a value number.

System 2 enables a process for calculating a benefit value. System 2 periodically checks if a calculated benefit value is positive or negative. A benefit value is defined herein as a cost subtracted from a value times a premium. If a benefit value is determined to be negative beyond a threshold of time (e.g., one week), system 2 will submit a request for a time extension to a deployer (e.g., computing system 14). If the time extension is granted, an associated event may be logged into a usage database and an associated virtual machine will remain in a running/deployed state. The usage database may be available for manual or automatic checks of enterprise policy on machine benefits and lifecycles (e.g., to determine who is providing too many time extensions). If the time extension is not granted (e.g., a deployer does not respond within a timeout or responds negatively), then the virtual machine is quieced (i.e., disabled but remaining deployed) for a period of time (e.g., two weeks). During the period of time (e.g., if the virtual machine needs to be enabled (e.g., restarted)), the deployer may request an extension of time for enabling the virtual machine. Additionally, the deployer may change a value/premium/cost so that a benefit becomes positive and time extensions are no longer necessary to keep the virtual machine from being disabled in the immediate future. If a disable time period expires without an extension, then the virtual machine is removed from deployment. There may be an option to archive a virtual machine image to storage so that it may be redeployed at a later time. An additional metric may be used to measure an average lifespan time of additional virtual machines. A configuration option may be available to notify and/or automatically extend a virtual machine that is flagged as negative benefit and is being recommended for removal from deployment. The configuration option may additionally (automatically) notify and/or remove from deployment, a virtual machine flagged as a positive benefit that has been running for an extended time period.

Figure 2A:
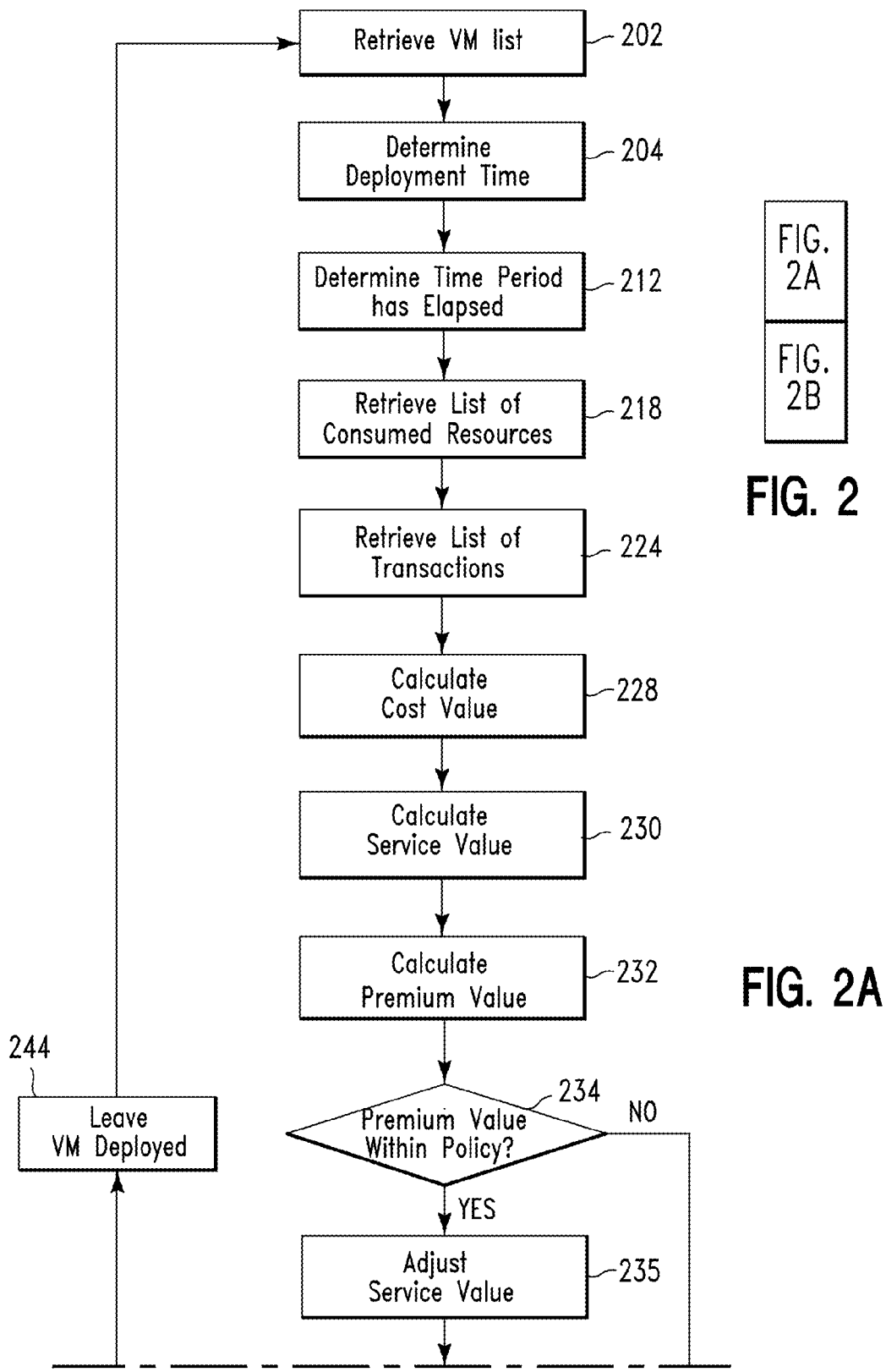
FIGS. 2A and 2B, illustrates a flowchart describing an algorithm used by the system of FIG. 1 for automatically managing virtual machines, in accordance with embodiments of the present invention.
Figure 2B:
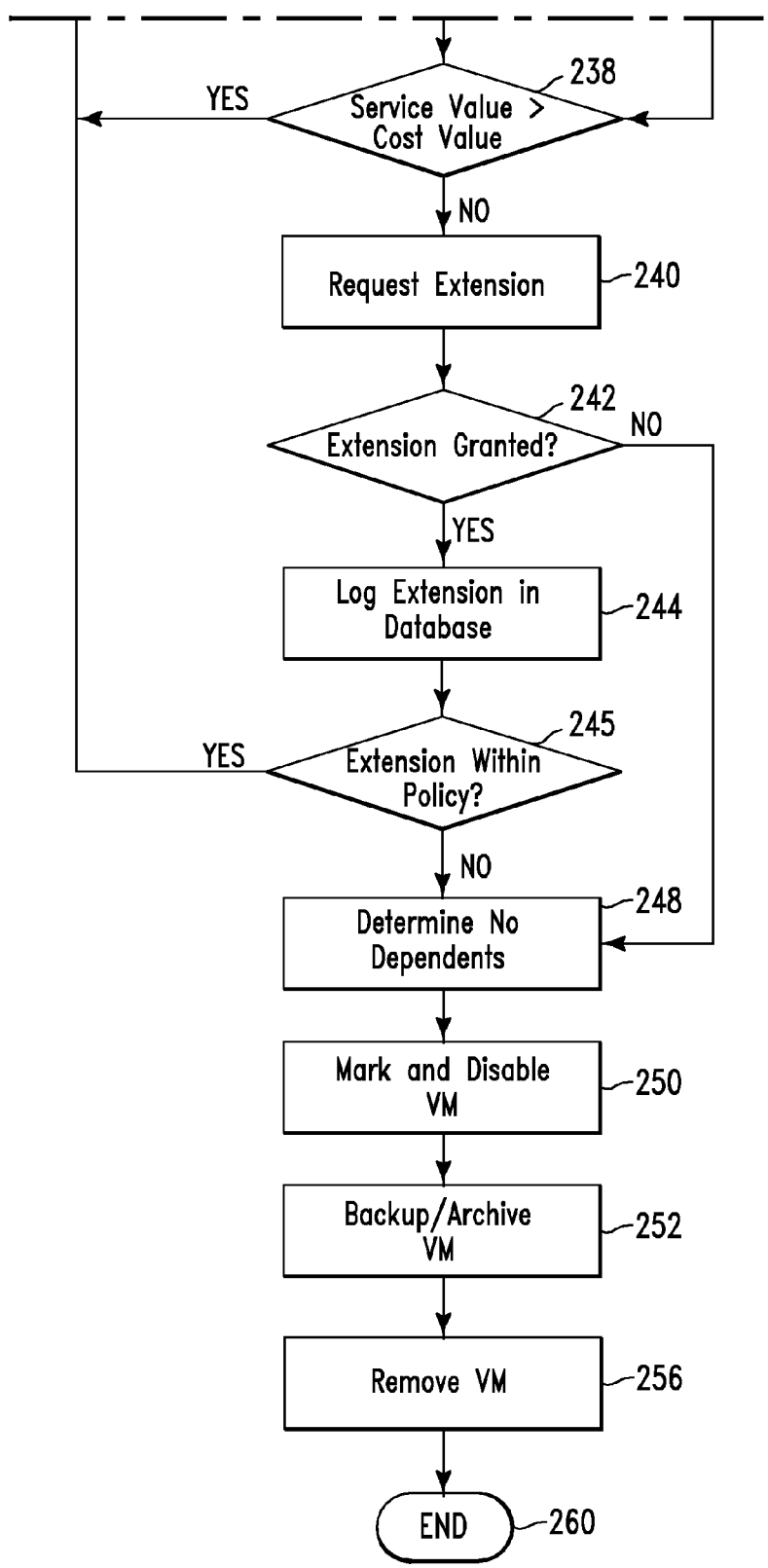

FIG. 2, including FIGS. 2A and 2B, illustrates a flowchart describing an algorithm used by system 2 of FIG. 1 for automatically managing virtual machines 5a . . . 5n, in accordance with embodiments of the present invention. In step 202, a list of virtual machines deployed in an enterprise is retrieved. A server (e.g., manager computing system 14 of FIG. 1) comprising virtual machines (e.g., virtual machines 5a . . . 5n of FIG. 1) comprises a management interface/API that may be programmatically queried to retrieve an inventory of enabled virtual machines already deployed within the enterprise. Alternatively, a database may be updated to indicate deployment (and/or removal from deployment) of a virtual machine. In step 204, a deployment time (i.e., an amount of time that a specific virtual machine has been deployed) is determined. In step 212, it is determined that the deployment time for a specific virtual machine exceeds a threshold (or a time since a last check exceeds a threshold). This triggers a new check of a net benefit to determine if the virtual machine should continue to be enabled in a deployed state. In step 218, a list of resources consumed by the virtual machine during deployment (during the specified time period) is retrieved. The list of resources is used to determine an overall cost of the virtual machine. The overall cost is based on:

1. Resources consumed (i.e., by the virtual machine) over time such as, inter alia, CPU cycles, RAM space, hard disk space, network traffic, etc.
2. Physical resources (consumed) of the actual server hardware such as, inter alia, power, cooling, floor space, etc.

The overall cost may comprise a fixed cost for the whole server or a usage-based ratio. In step 224, a list of transactions performed by the virtual machine during deployment (during the specified time period) is retrieved. The list of transactions is used to determine an overall value of a service (i.e., work) provided by the virtual machine. Determining the value of the service may include analyzing all transactions performed by the virtual machine. For example, an e-commerce virtual machine may process sales to customers in which case the virtual machine's value is a sum of some percentage of each sale (e.g., commission or sales enablement) retrieved from sale receipts. A database virtual machine may process lookups and updates in which case the virtual machine's value may comprise a count of lookups and update transactions. In step 228, a cost value (based on resources consumed) for deploying the virtual machine (for the specified time period) is calculated. The cost value is calculated by using information retrieved in step 218 and converting the information it into a single number sum. Therefore, the information retrieved in step 218 is mapped to a single cost number by multiplying each resource consumed by a cost metric of that resource. The cost value may comprise a real money value, such as for example "1 GHz of CPU costs $20 per month". Alternatively, the cost value may comprise a point value such as "1 GHz of CPU costs 100 points per month and 1 GB of RAM costs 20 points per month". Therefore (after determining all resources consumed), a single bottom-line number is calculated. For example, "for the time period, this virtual machine consumed $125 (or 3000 points) of resources". In step 230, a service value (i.e., a value based on services provided over the specified time period) is calculated. The service value is calculated by using information retrieved in step 224 and converting the information into a single number sum. Therefore, the information is mapped to a single value number by multiplying each transaction by some value metric of that transaction. The service value comprises a same metric as the cost value calculated in step 228. For example, each sale booked through the virtual machine is worth a 10% commission/enablement value, therefore $5000 in sales maps to $500 in value. As an additional example, each database lookup/update is worth 0.1 point, therefore 1000 lookups/updates is worth 100 points in value. In step 232, a premium value (of services provided) is calculated. A premium value comprises a single number with 1.0 being neutral. The premium value may be provided manually or automatically by a business analytics system. For example, sales are important during a holiday season and therefore, a premium value is greater than neutral (e.g., 1.5) which in effect raises a value E by 50%. As an additional example, a database is less-important for non-production data, therefore a premium value comprises a number such as 0.75, resulting in lowering the value E by 25%. In step 234, it is determined if the premium value is within a policy. A policy database (e.g., configured by management or business people) defining valid premium values is compared to the premium value to determine if the premium value is within a policy. Therefore, if an invalid premium value is provided, the invalid premium value could be ignored (i.e., no adjustment) or the invalid premium value may be pulled back to within a limit as defined by a policy (i.e., bounded). If in step 234, it is determined that the premium value is not within a policy, then step 238 is executed as described, infra. If in step 234, it is determined that the premium value is within a policy then step in 235, the service value is adjusted by the premium value (i.e., the service value is multiplied by the premium value). For example, a $500 service value (sales enablement) times 1.5 (i.e., premium value) equals $750. In step 238, it is determined if the service value is greater than the cost value. For example, a cost value of $125 is compared to a service value of $750. If in step 238, it is determined that the service value is greater than the cost value, then step in 244, the virtual machine remains deployed and step 202 is repeated. If in step 238, it is determined that the service value is not greater than the cost value then step in 240, a time extension is requested. Step 240 allows for flexibility (or sensitivity) as to when a virtual machine teardown (i.e., removal from deployment) should occur. Therefore, if a service value is less than a cost value, it may be time to tear down the virtual machine. Alternatively, there may be a temporary lull in the service value resulting in a negative benefit but which may go back up in a next time period thereby changing to a positive benefit. Therefore, a time extension may be requested to keep the virtual machine from a tear down (i.e., removal from deployment). In step 242, it is determined if the time extension is granted. If in step 242, it is determined the time extension is not granted then step 248 is executed as described, infra. If in step 242, it is determined the time extension is granted then step 244, the time extension may be optionally logged in a database. In step 245, it is determined if the time extension is within a policy. Step 245 may use a policy database defining a limit of how many extensions may be granted based on various situations. If in step 245, it is determined that the time extension is within a policy then step 244 is repeated. If in step 245, it is determined that the time extension is not within a policy then in step 244, it is determined that there are no dependents (i.e., one virtual machine dependent on another virtual machine). In step 250, the virtual machine is marked and disabled. For example, a database virtual machine is turned off but then a business discovers that a sales system stops functioning because the dependent database was turned off. In step 252, the virtual machine is archived (i.e., backed up) so that if it is later discovered that the virtual machine needs to be redeployed, it can do so with the original image of the virtual machine so it resumes in the same state at which it was undeployed. In step 256, the virtual machine is removed from deployment and the process is terminated in step 260.

Figure 3:
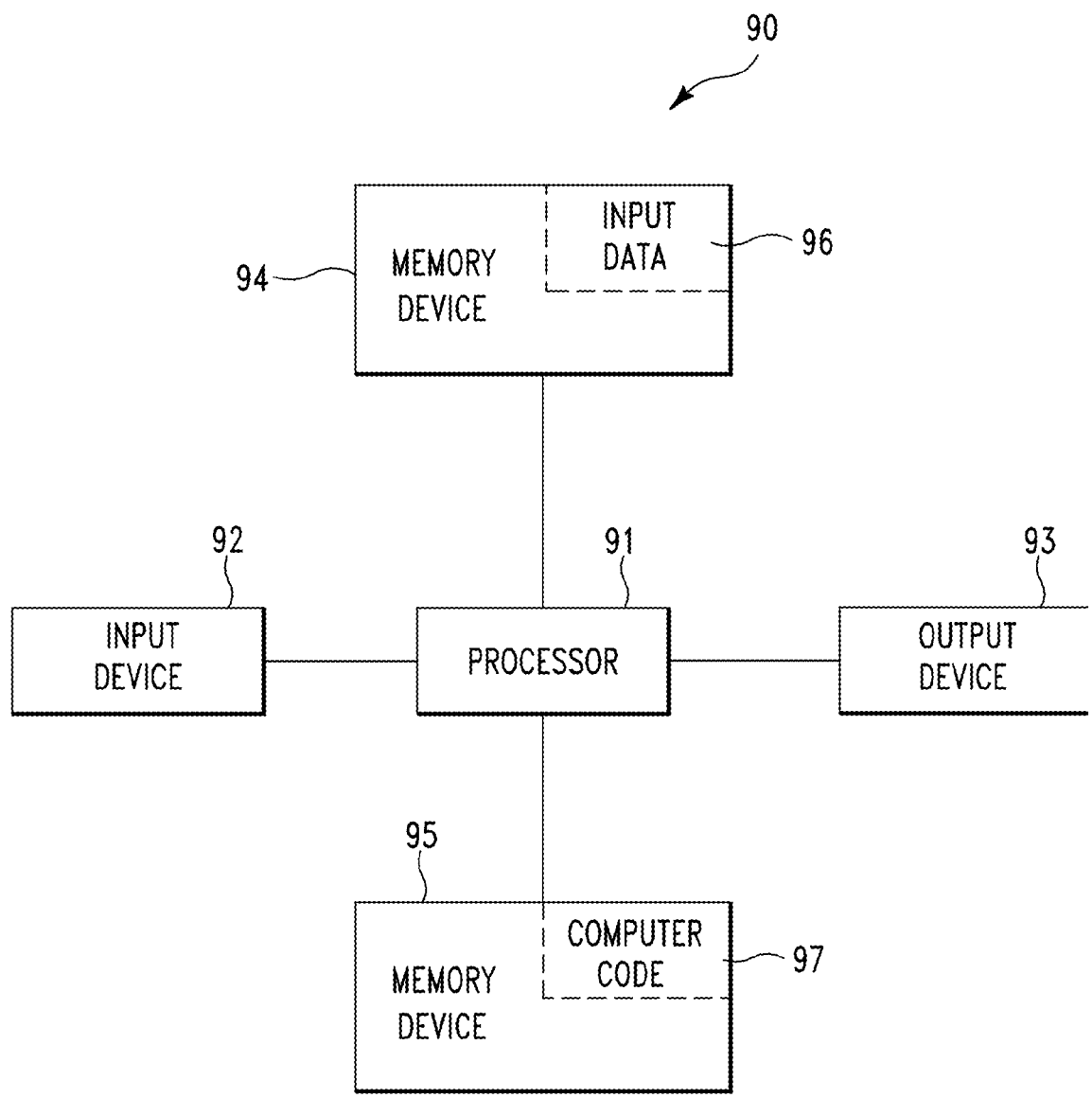
FIG. 3 illustrates a computer apparatus used for automatically managing virtual machines, in accordance with embodiments of the present invention.

FIG. 3 illustrates a computer apparatus 90 (e.g., computing system 14 of FIG. 1) used for automatically managing virtual machines, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for automatically managing virtual machines. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to automatically manage virtual machines. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automatically managing virtual machines. In another embodiment, the invention provides a business method that performs the process steps of the invention on a subscription, advertising, and/or fee basis. That is, a service supplier, such as a Solution Integrator, could offer to automatically manage virtual machines. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

receiving, by a computer processor of a computing system, a list of running virtual machines deployed for performing a list of services within an enterprise;

determining, by said computer processor, a specified time period associated with periodic checks of each virtual machine of said list of running virtual machines;

determining, by said computer processor, that said specified time period has elapsed since a last benefit check of said periodic checks;

retrieving, by said computer processor, a list of resources consumed by each said virtual machine during said specified time period;

retrieving, by said computer processor, said list of services performed by each said virtual machine during said specified time period;

calculating, by said computer processor based on said list of resources, a cost value for each said virtual machine for said specified time period;

calculating, by said computer processor based on said list of services, a service value for each said virtual machine for said specified time period;

calculating, by said computer processor based on said cost value and said service value, a premium value associated with said list of services for each said virtual machine for said specified time period; and determining, by said computer processor, if said premium value is within a policy for said enterprise, and if said premium value is within said policy for said enterprise, generating, by said computer processor, a modified service value comprising said service value multiplied by said premium value, and determining, by said computer processor, if said modified service value is greater than said cost value.

2. The method of claim 1, wherein said modified service value is greater than said cost value, and wherein said method further comprises:

continuing, by said computer processor, to run said virtual machines.

3. The method of claim 1, wherein said modified service value is not greater than said cost value, and wherein said method further comprises:

receiving, by said computer processor, a time extension for continuing to run said virtual machines;

approving, by said computer processor, said time extension; and determining, by said computer processor, if said time extension is within said policy for said enterprise.

4. The method of claim 3, wherein said time extension is within said policy for said enterprise, and wherein said method further comprises:

continuing, by said computer processor, to run said virtual machines.

5. The method of claim 3, wherein said time extension is not within said policy for said enterprise, and wherein said method further comprises:

determining, by said computer processor, if there are any dependents associated with said first virtual machine.

6. The method of claim 5, wherein there are dependents associated with said first virtual machine, and wherein said method further comprises:

determining, by said computer processor, that a deployment exception is within said policy for said enterprise.

7. The method of claim 5, wherein there are not any dependents associated with said first virtual machine, and wherein said method further comprises:

marking, by said computer processor, each said virtual machine for teardown;

quiescing, by said computer processor in response to said marking, each said virtual machine; and determining, by said computer processor, if each said virtual machine should be retained.

8. The method of claim 7, wherein each said virtual machine is retained, and wherein said method further comprises:

unquiescing, by said computer processor, each said virtual machine; and increasing, by said computer processor, said premium value.

9. The method of claim 7, wherein each said virtual machine is not retained, and wherein said method further comprises:

generating and storing, by said computer processor, an archive/backup data file associated with each said virtual machine; and removing, by said computer processor, each said virtual machine from said enterprise.

10. A computing system comprising a computer processor coupled to a computer-readable memory unit, said memory unit comprising instructions that when executed by the computer processor implements a method comprising:

receiving, by said computer processor of said computing system, a list of running virtual machines deployed for performing a list of services within an enterprise;

determining, by said computer processor, a specified time period associated with periodic checks of each virtual machine of said list of running virtual machines;

determining, by said computer processor, that said specified time period has elapsed since a last benefit check of said periodic checks;

retrieving, by said computer processor, a list of resources consumed by each said virtual machine during said specified time period;

retrieving, by said computer processor, said list of services performed by each said virtual machine during said specified time period;

calculating, by said computer processor based on said list of resources, a cost value for each said virtual machine for said specified time period;

calculating, by said computer processor based on said list of services, a service value for each said virtual machine for said specified time period;

calculating, by said computer processor based on said cost value and said service value, a premium value associated with said list of services for each said virtual machine for said specified time period; and determining, by said computer processor, if said premium value is within a policy for said enterprise, and if said premium value is within said policy for said enterprise,
generating, by said computer processor, a modified service value comprising said service value multiplied by said premium value, and
determining, by said computer processor, if said modified service value is greater than said cost value.

11. The computing system of claim 10, wherein said modified service value is greater than said cost value, and wherein said method further comprises:
continuing, by said computer processor, to run said virtual machines.

12. The computing system of claim 10, wherein said modified service value is not greater than said cost value, and wherein said method further comprises:
receiving, by said computer processor, a time extension for continuing to run said virtual machines;
approving, by said computer processor, said time extension; and
determining, by said computer processor, if said time extension is within said policy for said enterprise.

13. The computing system of claim 12, wherein said time extension is within said policy for said enterprise, and wherein said method further comprises:
continuing, by said computer processor, to run said virtual machines.

14. The computing system of claim 12, wherein said time extension is not within said policy for said enterprise, and wherein said method further comprises:
determining, by said computer processor, if there are any dependents associated with said first virtual machine.

15. The computing system of claim 14, wherein there are dependents associated with said first virtual machine, and wherein said method further comprises:
determining, by said computer processor, that a deployment exception is within said policy for said enterprise.

16. The computing system of claim 14, wherein there are not any dependents associated with said first virtual machine, and wherein said method further comprises:
marking, by said computer processor, each said virtual machine for teardown;
quiescing, by said computer processor in response to said marking, each said virtual machine; and
determining, by said computer processor, if each said virtual machine should be retained.

17. A computer program product, comprising a computer readable hardware storage medium having a computer readable program code embodied therein, said computer readable program code comprising an algorithm that when executed by a computer processor of a computing system implements a method comprising:
receiving, by said computer processor of said computing system, a list of running virtual machines deployed for performing a list of services within an enterprise;
determining, by said computer processor, a specified time period associated with periodic checks of each virtual machine of said list of running virtual machines;
determining, by said computer processor, that said specified time period has elapsed since a last benefit check of said periodic checks;
retrieving, by said computer processor, a list of resources consumed by each said virtual machine during said specified time period;
retrieving, by said computer processor, said list of services performed by each said virtual machine during said specified time period;
calculating, by said computer processor based on said list of resources, a cost value for each said virtual machine for said specified time period;
calculating, by said computer processor based on said list of services, a first service value for each said virtual machine for said specified time period;
calculating, by said computer processor based on said cost value and said service value, a premium value associated with said list of services for each said virtual machine for said specified time period; and
determining, by said computer processor, if said first premium value is within a policy for said enterprise, and
if said premium value is within said policy for said enterprise,
generating, by said computer processor, a modified service value comprising said service value multiplied by said premium value, and
determining, by said computer processor, if said modified service value is greater than said cost value.

18. A process for supporting computer infrastructure, said process comprising providing at least one support service for at least one of creating, integrating, hosting, maintaining, and deploying computer-readable code in a computing system, wherein the code in combination with the computing system is capable of performing a method when executed by a computer processor of the computing system, said method comprising:
receiving, by a computer processor of a computing system, a list of running virtual machines deployed for performing a list of services within an enterprise;
determining, by said computer processor, a specified time period associated with periodic checks of each virtual machine of said list of running virtual machines;
determining, by said computer processor, that said specified time period has elapsed since a last benefit check of said periodic checks;
retrieving, by said computer processor, a list of resources consumed by each said virtual machine during said specified time period;

retrieving, by said computer processor, said list of services performed by each said virtual machine during said specified time period;

calculating, by said computer processor based on said list of resources, a cost value for each said virtual machine for said specified time period;

calculating, by said computer processor based on said list of services, a service value for each said virtual machine for said specified time period;

calculating, by said computer processor based on said cost value and said service value, a premium value associated with said list of services for each said virtual machine for said specified time period; and determining, by said computer processor, if said premium value is within a policy for said enterprise, and if said premium value is within said policy for said enterprise,
- generating, by said computer processor, a modified service value comprising said service value multiplied by said premium value, and
- determining, by said computer processor, if said modified service value is greater than said cost value.

* * * * *